US010145361B2

(12) United States Patent
Agarwal

(10) Patent No.: US 10,145,361 B2
(45) Date of Patent: Dec. 4, 2018

(54) METHODS AND SYSTEMS TO SHUT DOWN A WIND TURBINE

(71) Applicant: General Electric Company, Schenectady, NY (US)

(72) Inventor: Pranav Agarwal, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 779 days.

(21) Appl. No.: 14/088,474

(22) Filed: Nov. 25, 2013

(65) Prior Publication Data

US 2015/0147173 A1    May 28, 2015

(51) Int. Cl.
*F03D 7/02*       (2006.01)
*F03D 7/04*       (2006.01)
*F03D 17/00*      (2016.01)

(52) U.S. Cl.
CPC ......... *F03D 7/0264* (2013.01); *F03D 7/0224* (2013.01); *F03D 7/0244* (2013.01); *F03D 7/0268* (2013.01); *F03D 7/0296* (2013.01); *F03D 7/044* (2013.01); *F03D 17/00* (2016.05); *F05B 2260/96* (2013.01); *F05B 2270/328* (2013.01); *F05B 2270/334* (2013.01); *Y02E 10/723* (2013.01)

(58) Field of Classification Search
CPC .... F03D 7/0224; F03D 7/0244; F03D 7/0264; F03D 7/0268; F03D 7/0276; F03D 7/0296; F03D 7/044; F03D 11/0091; F05B 2260/901; F05B 2260/96; F05B 2270/328; F05B 2270/334
See application file for complete search history.

(56) References Cited

U.S. PATENT DOCUMENTS

| | | | |
|---|---|---|---|
| 7,755,210 | B2 | 7/2010 | Kammer et al. |
| 7,942,629 | B2 | 5/2011 | Shi et al. |
| 8,123,477 | B2 | 2/2012 | Risager et al. |
| 8,186,949 | B2 | 5/2012 | Nielsen et al. |
| 8,221,076 | B2 | 7/2012 | Jeppesen et al. |

(Continued)

FOREIGN PATENT DOCUMENTS

| | | |
|---|---|---|
| EP | 1701034 A2 | 9/2006 |
| EP | 2389510 A2 | 11/2011 |

(Continued)

OTHER PUBLICATIONS

Sherif El-Henaoui, " Individual Pitch Control and Its Impact", windsystemsmag.com, Wind Systems , Issue Date: Jul. 2012, pp. 50-55.

(Continued)

*Primary Examiner* — David E Sosnowski
*Assistant Examiner* — Juan G Flores
(74) *Attorney, Agent, or Firm* — GE Global Patent Operation; Nitin Joshi

(57) ABSTRACT

A wind turbine system is presented. The wind turbine system includes a wind turbine comprising a plurality of blades and a tower, and a processing subsystem configured to shut down the wind turbine by non-linearly pitching out the plurality of blades in the wind turbine towards a feather position at a pitch rate determined based upon a tower-fore-aft velocity of a top-portion of the tower during oscillations of the tower.

3 Claims, 6 Drawing Sheets

(56) References Cited

U.S. PATENT DOCUMENTS

| | | |
|---|---|---|
| 8,348,617 B2 | 1/2013 | Moachold |
| 2010/0119369 A1* | 5/2010 | Risager ................ F03D 7/0224 416/1 |
| 2012/0139240 A1 | 6/2012 | Otamendi et al. |

FOREIGN PATENT DOCUMENTS

| | | | |
|---|---|---|---|
| EP | 2746576 A2 | 6/2014 | |
| WO | 2010060772 A2 | 6/2010 | |
| WO | WO 2010060772 A2 * | 6/2010 | ............ F03D 7/022 |
| WO | 2010139613 A2 | 12/2010 | |
| WO | WO 2010139613 A2 * | 12/2010 | ........... F03D 7/0224 |

OTHER PUBLICATIONS

European Search Report and Opinion issued in connection with corresponding EP Application No. 14192542 dated Apr. 22, 2015.
European Office Action issued in connection with corresponding EP Application No. 14192542.0 dated Jan. 30, 2018.

\* cited by examiner

METHODS AND SYSTEMS TO SHUT DOWN A WIND TURBINE

BACKGROUND

Embodiments of the present disclosure are related to wind turbines, and more particularly to methods and systems to shut down a wind turbine.

Due to various factors including aerodynamic forces, wind turbines may have oscillations. FIG. 1 is a perspective view of an exemplary prior art wind turbine 100 to explain oscillations 112 in the wind turbine 100. The wind turbine 100 includes a tower 102, a rotor 104 having a plurality of blades 106, and a nacelle 108. The tower 102 may be coupled to ground, to an ocean floor, or to a floating foundation using any known securing means, such as bolting, cementing, welding, and so on.

Further, in FIG. 1 reference numeral 110 is generally representative of wind. The wind 110 may have a wind speed (v). Moreover, as the wind 110 blows in the indicated direction, the wind 110 typically imposes an aerodynamic torque ($M_z$) and an aerodynamic thrust (Fz) on the wind turbine 100. Particularly, the aerodynamic torque (Mz) imposed on the blades 106 may cause the blades 106 to rotate in a direction that is substantially perpendicular to the direction of the wind 110. This motion of the blades 106 is represented in FIG. 1 by an angular rotor speed ($\omega_r$) of the rotating blades 106.

The wind 110 imposes the aerodynamic thrust (Fz) perpendicular to the rotor 104, causing a top-portion 103 of the tower 102 to move in a downwind direction 114. As used herein, the term "top-portion of a tower" refers to a portion of a tower of a wind turbine that moves and bends during oscillations in the tower while a base of the tower is fixed. Accordingly, the aerodynamic thrust (Fz) moves the top-portion 103 of the tower 102 towards a downwind direction 114 until a downwind position (shown in FIG. 2) is reached. Furthermore, a restoring force $R1_z$ (shown in FIG. 2) moves the top-portion 103 of the tower 102 in an upwind direction 116 until an upwind position (shown in FIG. 2) is reached. The movement of the top-portion 103 of the tower 102 towards the downwind direction 114 and the upwind direction 116 continues resulting in the oscillations 112 in the tower 102. In the presently shown configuration, the oscillations 112, for example, are fore-aft oscillations 112. Hereinafter, the term "oscillations" shall be referred to as "fore-aft oscillations". Exemplary fore-aft oscillations in the tower 102 are shown with reference to FIG. 2.

Referring now to FIG. 2, a diagrammatic illustration 200 of the tower 102 of the prior art wind turbine 100, referred to in FIG. 1, is shown to explain the fore-aft oscillations 112. Reference numeral 202 shows an original position of the tower 102 when the top-portion 103 of the tower 102 is not deflected or bent. As previously noted with reference to FIG. 1, the wind 110 imposes the aerodynamic force $F_z$ to move the top-portion 103 of the tower 102 in the downwind direction 114 towards a downwind position 204, also referred to herein as "downwind movement". Accordingly, the aerodynamic force $F_z$ results in deflection of the top-portion 103 of the tower 102 in the downwind direction 114 towards a downwind position 204. After reaching the downwind position 204, a resultant of the restoring force $R1_z$ and the aerodynamic force $F_z$ acts on the tower 102 from an opposite direction to move the top-portion 103 of the tower 102 in the upwind direction 116 towards an upwind position 206, also referred to herein as "upwind movement". The movement of the top-portion 103 of the tower 102 continues between upwind positions and downwind positions. The movement of the top-portion 103 of the tower 102 between the upwind positions and the downwind positions is referred to as the fore-aft oscillations 112. It is noted that while the fore-aft oscillations 112 are explained in association with the wind 110, various other factors may initiate and aggravate the fore-aft oscillations 112.

Wind turbines typically operate in a determined range of wind speeds. Moreover, wind turbines operate optimally in uniform wind conditions. Accordingly, it may not be desirable to operate the wind turbine 100 during gusts or excessive turbulence, excessively high wind speeds or very low wind speeds. In these conditions, the wind turbine 100 is usually shut down. The wind turbine 100 may also be shut down for routine or exceptional maintenance and faults due to actuator/sensor failures in the wind turbine 100 However, the shutdown process of the wind turbine 100 may aggravate the fore-aft oscillations 112 in the wind turbine 100. The aggravated oscillations 112 may induce large structural loads potentially causing wear and damage to the wind turbine 102.

Currently, various techniques are available to shut down a wind turbine. One technique entails pitching blades of the wind turbine from the operating position to a feathered parking position at a uniform rate. This technique, however, can lead to large vibrations in the fore-aft direction. Another technique, commonly referred to as a triple-pitch braking, is often utilized to prevent the large structural loads associated with shutting down the wind turbine. In the triple-pitch approach, the blades are pitched from their operating position to the feathered parking position in three stages. In a first stage, the blades are pitched at a fast rate for a first fixed interval of time, for example 1.5 seconds. Thereafter, during a second stage, the blades are pitched at a slower speed for a second fixed interval of time, for example 1.5 seconds. In addition, in a third stage, the pitching rate is once again increased, until the blades reach the feathered position. Though this technique attempts to obviate the shortcomings of the uniform pitching technique, the triple pitch approach is based on a pre-defined pitching profile and an open-loop controlled approach. Particularly, the pitching rate and the time interval for each stage of the three stages is determined based on worst-case expected behavior over a finite set of wind conditions. Therefore, implementation of the triple pitch approach to shut down the wind turbine may also result in a negative aerodynamic thrust on the wind turbine or reduced thrust when the wind turbine is moving in upwind direction resulting in un-damping of tower and the accompanying drawbacks. Accordingly, the triple triple-pitch approach may sometimes increase aerodynamic loads on the wind turbine, thereby compounding the fore-aft vibration problem.

In addition to these techniques, various closed-loop controller techniques have been employed to shut down the wind turbine. Moreover, these techniques also attempt to obviate the issues associated with shutting down the wind turbine. One such closed-loop technique is commonly referred to as a zero-acceleration approach. In this approach, the blades are pitched towards the feathered position until the aerodynamic thrust on the wind turbine is reduced to zero. Thereafter, the system controls the pitch angle of the blades such that the aerodynamic thrust remains zero until the tower has reached an equilibrium position. Subsequently, the blades are pitched again towards the feathered position. Though this approach may aid in reducing excessive oscillations in the tower, this approach prolongs the shutdown time risking damage to wind turbines.

BRIEF DESCRIPTION

A wind turbine system is presented. The wind turbine system includes a wind turbine comprising a plurality of blades and a tower, and a processing subsystem configured to shut down the wind turbine by non-linearly pitching out the plurality of blades in the wind turbine towards a feather position at a pitch rate determined based upon a tower-fore-aft velocity of a top-portion of the tower during oscillations of the tower.

A method to shut down a wind turbine is presented. The method includes non-linearly pitching out a plurality of blades in the wind turbine towards a feather position at a pitch rate determined based upon a tower-fore-aft velocity of a top-portion of a tower in the wind turbine during oscillations of the tower.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments of the systems and methods described herein operate to shut down a wind turbine. Particularly, the present systems and methods operate to shut down a wind turbine by pitching out blades in the wind turbine at a pitch rate determined based upon tower-fore-aft velocity of a top-portion of a tower. As used herein, the phrase "top-portion of a tower" refers to a portion of a tower of a wind turbine that moves during oscillations in the tower while a base of the tower is fixed. As used herein, the term "tower-fore-aft velocity" is used to refer to velocity of a top-portion of a tower with respect to ground/or a fixed portion of a wind turbine during oscillations in the tower. The present systems and methods pitch out blades of the wind turbine towards a feather position at the pitch rate determined based upon the tower-fore-aft velocity of the top-portion of the wind turbine. As used herein, the term "feather position" refers to a pitch angle of a rotor blade, wherein the pitch angle results in substantially zero lift force and substantially zero drag force acting on the rotor blade.

It is noted that the tower-fore-aft velocity is indicative of a state of the top-portion of the tower. The state of the top-portion of the tower, for example, includes downwind movement of the top-portion of the tower and upwind movement of the top-portion of the tower during oscillations in the tower. Accordingly, the pitching out of the blades towards the feather position at the pitch rate determined based upon the tower-fore-aft velocity results in shutdown of the wind turbine based upon the state of the top-portion of the tower. The shutdown of the wind turbine based upon the state of the top-portion of the tower non-linearly dampens, and prevents aggravation of oscillations in the tower.

Embodiments of the present disclosure are described with reference to a land-based three-blade wind turbine. It will be understood, however, that such a reference is merely exemplary and that the systems and methods described here may just as easily be implemented in floating wind turbines, offshore wind turbines, 2-blade wind turbines, or n-blade wind turbines without departing from the scope of the present disclosure.

Furthermore, embodiments of the present disclosure are described with reference to an individual wind turbine. However, it will be understood that the teachings of the present disclosure may be utilized to shut down more than one wind turbine simultaneously or to shut down an entire wind farm, without departing from the scope of the present disclosure.

Figure 1:
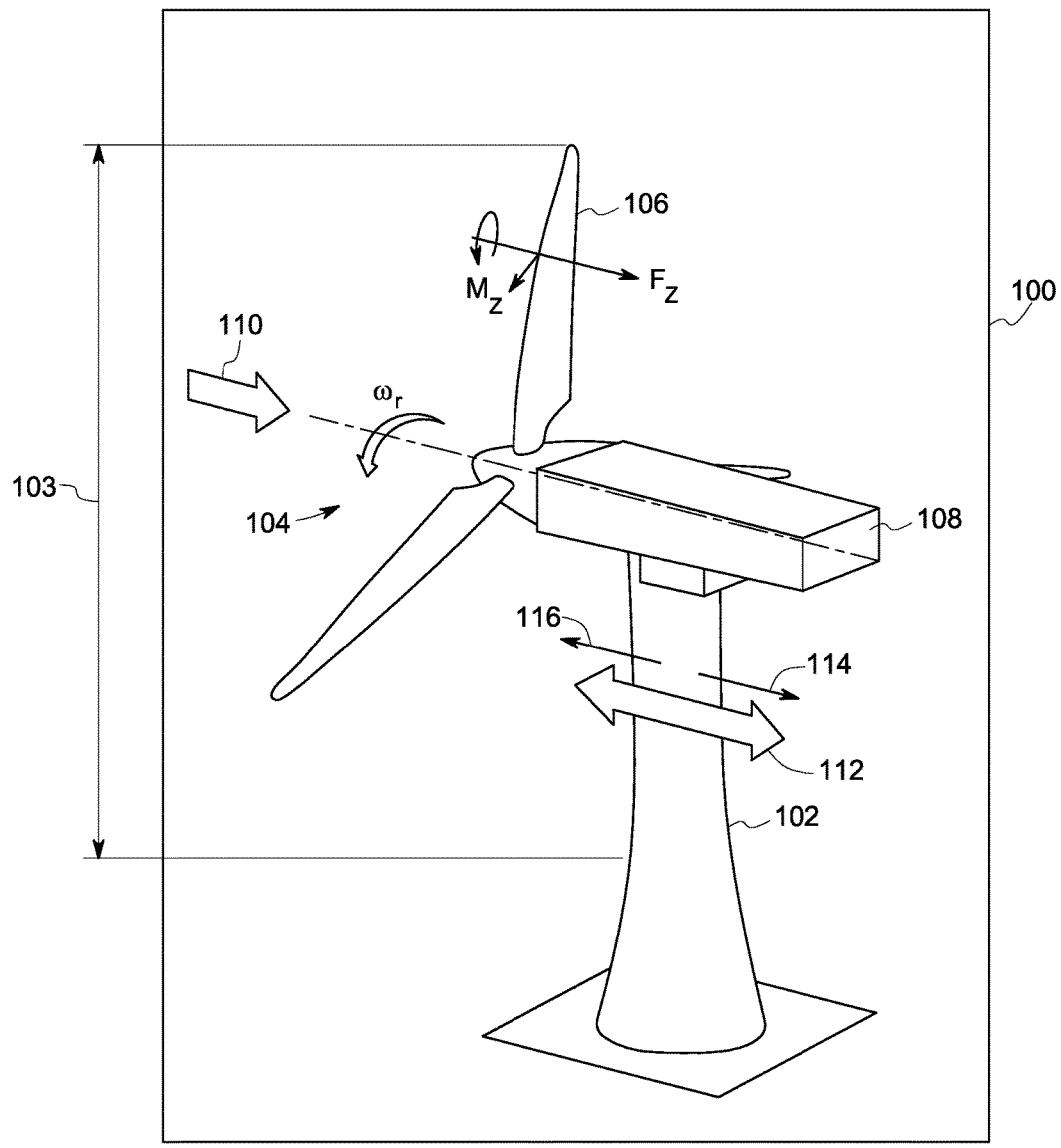
FIG. 1 is a perspective view of an exemplary prior art wind turbine to explain oscillations in the wind turbine.
Figure 3:
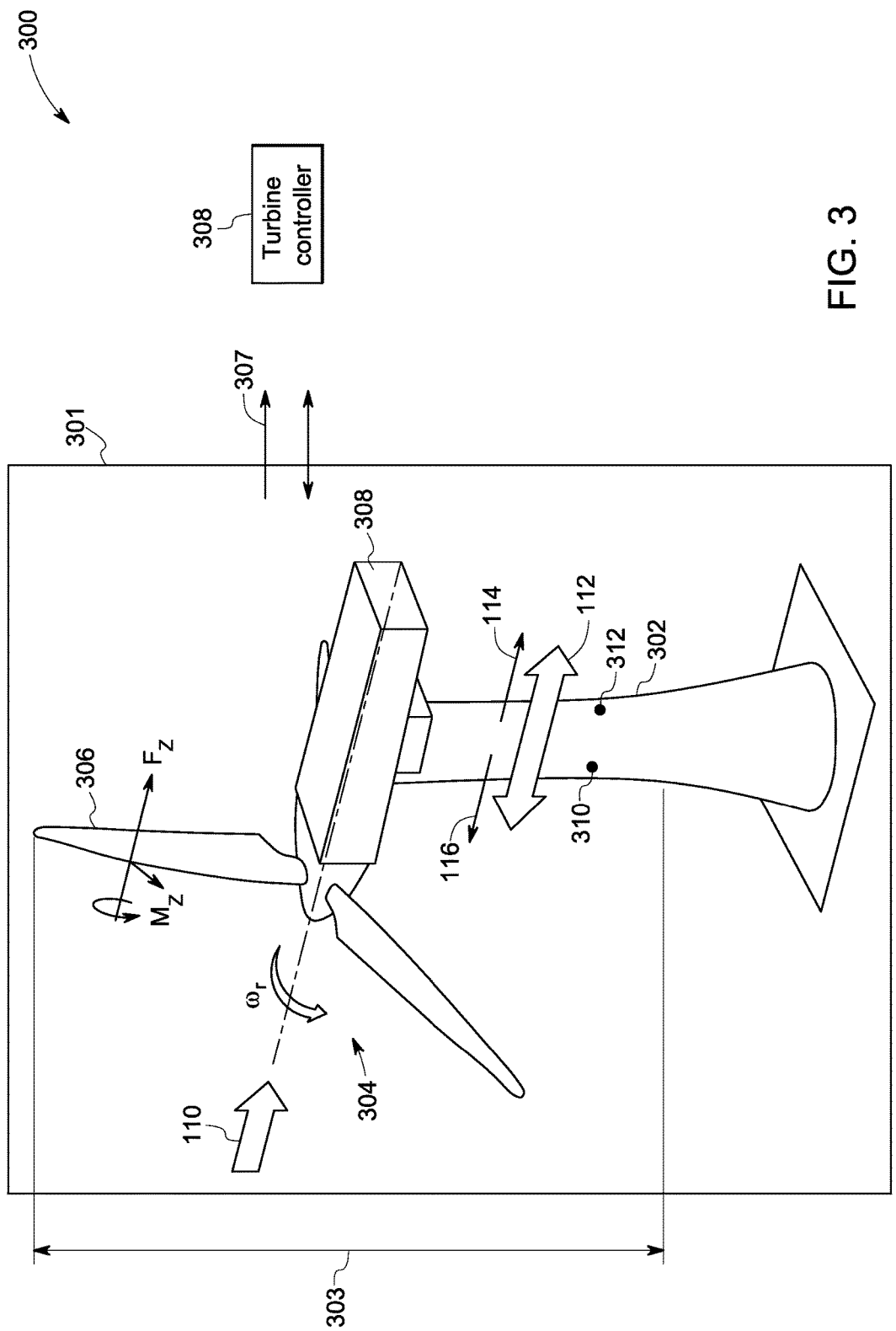
FIG. 3 is a diagrammatic illustration of a wind turbine system to explain shut down of a wind turbine system, in accordance with aspects of the present disclosure.

FIG. 3 is a diagrammatical representation of an exemplary wind turbine system 300 to explain shutdown of a wind turbine, such as a wind turbine 301 referred to in FIG. 1, according to aspects of the present disclosure. The wind turbine 301 includes a tower 302, a rotor 304 having a plurality of blades 306, and a nacelle 308. In the presently shown embodiment, the wind turbine 301 includes a plurality of sensing devices 310, 312 disposed at multiple locations on the wind turbine 301. In the embodiment of FIG. 3, the sensing devices 310, 312 are located on the tower 302 of the wind turbine 301. However, the sensing devices 310, 312 need not be located on the tower 302.

The sensing devices 310, 312 generate signals 307 that may be processed to determine a tower-fore-aft velocity of a top-portion 303 of the tower 302 during the fore-aft oscillations 112. In the presently shown configuration, the sensing devices 308, 310 are accelerometer sensors. Therefore, in the presently shown configuration, the signals 307 are acceleration signals representative of acceleration of the top-portion 303 of the tower 302 during the fore-aft oscillations 112. In an alternative embodiment, the sensing devices 310, 312 may be velocity sensors that generate signals representative of the tower-fore aft velocity of the tower 302. The sensing devices 310, 312 may further include a tower top inclinometer device, a multi inertial measurement unit, a strain gauge device, a ground based lidar device, or the like.

The wind turbine system 300 further includes a turbine controller 308 that controls the wind turbine 301. The turbine controller 308, for example, may be a microprocessor, a processing device, or the like. The turbine controller 308 may be located inside the nacelle 108, at the base of the tower 302, inside the tower 302, outside or at remote location from the wind turbine 301, or at another suitable location. The turbine controller 308 is in operational communication with the sensing devices 310, 312. The turbine controller 308, for example, may be in a wired communication or a wireless communication with the sensing devices 310, 312. The turbine controller 308 receives the signals 307 from the sensing devices 310, 312. Furthermore, the turbine controller 308 determines the tower-fore-aft-velocity of the top-portion 303 of the tower 302 based upon the signals 307. In one embodiment, the signals 307 are the acceleration signals and the turbine controller 308 determines the tower-fore-aft-velocity based upon the acceleration signals. The tower-fore-aft velocity, for example, may be determined based upon the measured acceleration signals using a kalman filter formulation. Furthermore, in one embodiment, the turbine controller 308 shuts down the wind turbine 301 at a pitch rate determined based upon the tower-fore-aft velocity of the top-portion 303 of the tower 302. The shutdown of the wind turbine 301 typically includes pitching out the blades 306 towards a feather position. Therefore, in the presently shown configuration, the turbine controller 308 pitches out the blades 306 towards the feather position at the pitch rate determined based upon the tower-fore-aft velocity. In one embodiment, the turbine controller 308 non-linearly pitches out the blades 306 towards the feather position at the pitch rate determined based upon the tower-fore-aft velocity. The pitch rate, for example, may be a first pitch rate or a second pitch rate where the first pitch rate is faster than the second pitch rate. In one embodiment, the first pitch rate is the rated pitch rate of the wind turbine 301. As used herein, the term "rated pitch rate" refers to a maximum pitch rate of a wind turbine that is marked or indicated by the manufacturer of the wind turbine. The second pitch rate, for example, may be determined by application of a linear control law. In one embodiment, the second pitch rate is determined based upon a plurality of factors including wind speed, rotor velocity set point, maximum rotor speed, optimal tip speed ratio operating point, measured generator speed, linear control gains and other functional control loops contributing to pitch command.

The turbine controller 308 compares the tower-fore-aft velocity with the determined value to determine whether the tower 302 is moving in the downwind direction or the upwind direction. In one embodiment, the turbine controller 308, for example, shuts down the wind turbine at the first pitch rate when the tower-fore-aft velocity is greater than or equal to a determined value. For the purposes of example, in the presently shown configuration, when the tower-fore-aft velocity is greater than or equal to the determined value, the tower-fore-aft velocity is indicative of the downwind movement of the top-portion 303 of the tower 302. Therefore, the turbine controller 308 pitches out the blades 306 towards the feather position at the first pitch rate when the tower-fore-aft velocity is greater than or equal to the determined value. As used herein, the term "determined value" refers to a numerical value that satisfies a condition that when the determined value is substantially equal to a tower-fore-aft velocity of a top-portion of a tower of a wind turbine, the tower-fore-aft velocity indicates nil or minimal oscillations in the tower. In one embodiment, the determined value is substantially zero meter/second. In another embodiment, the determined value, for example may be substantially about zero or −0.1 meter/second when the downwind movement of the top portion 303 of the tower 302 of the wind turbine 301 is indicated by a positive tower-fore aft velocity and an upwind movement of the top portion 303 of the tower 302 is indicated by a negative tower-fore-aft velocity. In yet another embodiment, the determined value, for example may be substantially about zero or +0.1 meter/second when the downwind movement of the top portion of the tower of the wind turbine is indicated by a negative tower-fore aft velocity and an upwind movement of the top portion of the tower is indicated by a positive tower-fore-aft velocity. The selection of the determined value equal to −0.1 meter/second ensures that the turbine controller 308 of FIG. 3 pitches out the blades 306 at the first pitch rate when the tower-fore aft velocity of the top-portion 303 of the tower 302 is zero. In another embodiment, the turbine controller 308 pitches out the blades 306 towards the feather position at the first pitch rate till the tower-fore-aft velocity is greater than or equal to the determined value.

Furthermore, the turbine controller 308 pitches out the blades 306 at the second pitch rate when the tower-fore-aft velocity is less than the determined value. In the presently shown configuration, when the tower-fore-aft velocity is less than the determined value, the tower-fore-aft velocity is indicative of the upwind movement of the top-portion 303 of the tower 302 towards the upwind direction 116 during the fore-aft oscillations 112. Accordingly, the turbine controller 308 pitches out the blades 306 towards the feather position at the second pitch rate when the tower-fore-aft velocity is indicative of the upwind movement of the top-portion 303 of the tower 302.

As previously noted, the downwind movement and the upwind movement of the top-portion 303 of the tower 302 are representative of a state of the tower 302. Accordingly, the shutdown of the wind turbine 301 at the pitch rate determined based upon the tower-fore-aft velocity of the top-portion 303 of the tower 302 results in shutdown of the wind turbine 301 based upon the state of the tower 302. The shutdown of the wind turbine 301 based upon the state of the tower 302 results in nonlinear damping of the fore-aft oscillations 112 in the tower 302, and prevents aggravation of the fore-aft-oscillations 112. The non-linear damping of the fore-aft oscillations 112 reduces stresses and loads acting on the wind turbine 301 due to the fore-aft oscillations 112. Accordingly, the shutdown of the wind turbine 301 based upon the state of the tower 302 results in reduced wear and tear of the wind turbine 301.

Figure 2:
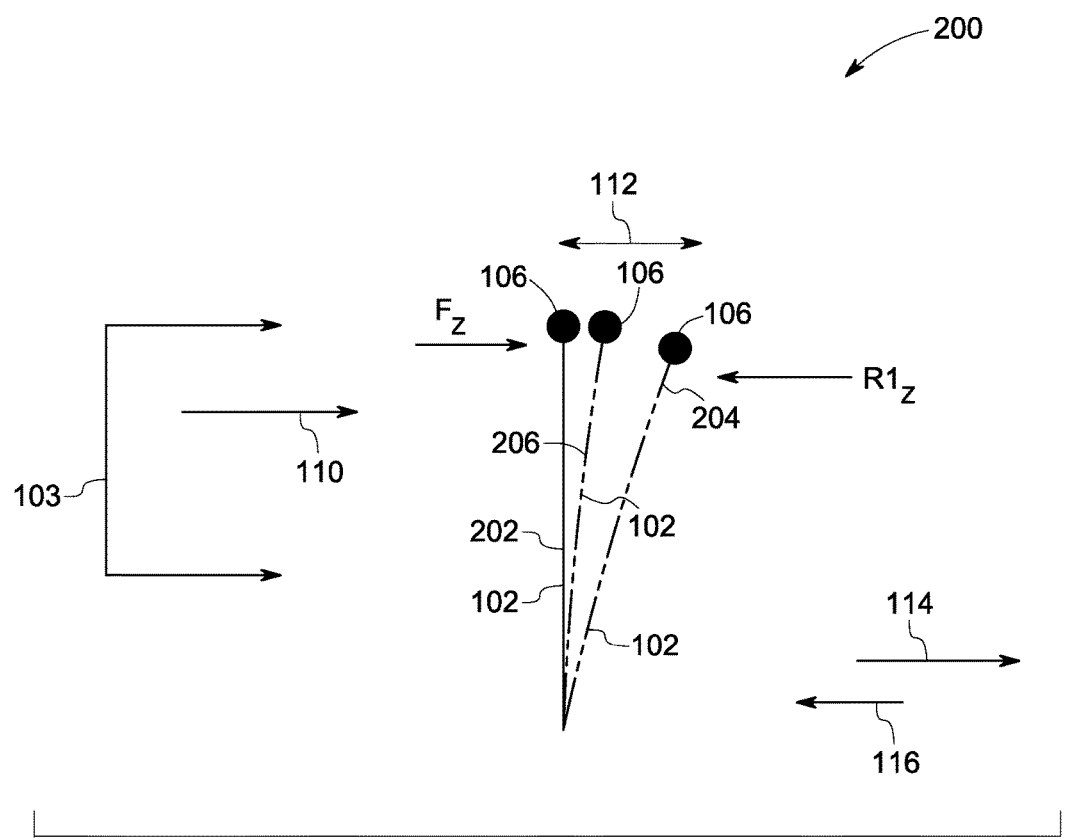
FIG. 2 is a diagrammatic illustration of the tower of the prior art wind turbine, referred to in FIG. 1, to explain the fore-aft oscillations.
Figure 4:
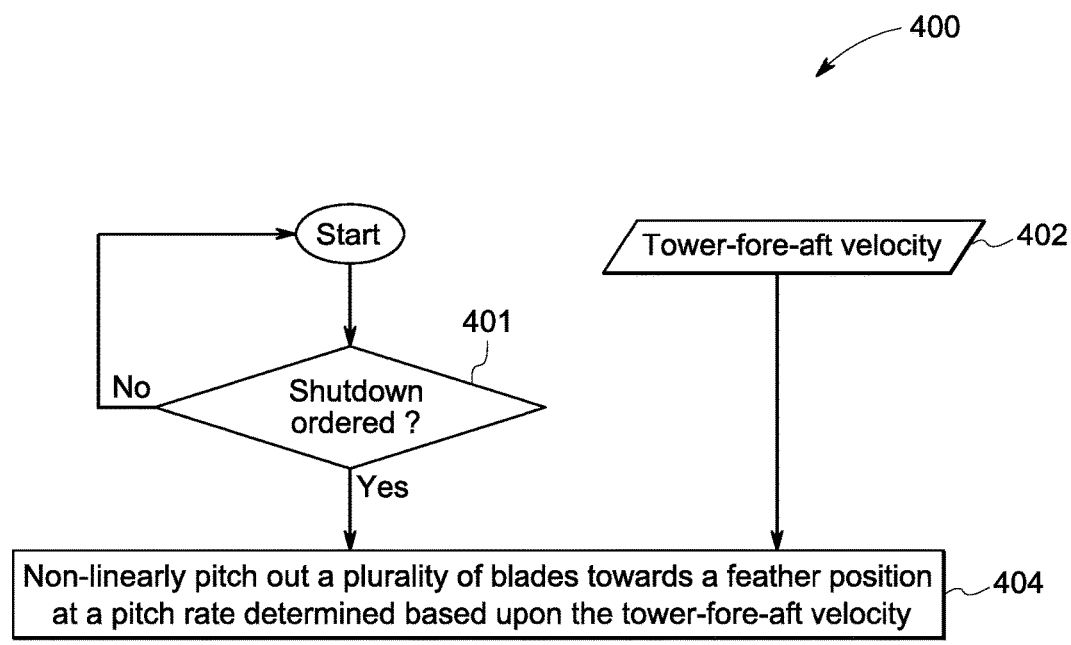
FIG. 4 is a flow chart illustrating an exemplary method to shut down a wind turbine, in accordance with one embodiment of the present techniques.

FIG. 4 is a flow chart illustrating an exemplary method 400 to control a wind turbine, in accordance with one embodiment of the present techniques. In one embodiment, FIG. 4 explains shutdown of the wind turbine. Reference numeral 402 is representative of tower-fore-aft velocity of a top-portion of a tower in the wind turbine. The tower-fore-aft velocity 402, for example, is the tower-fore-aft velocity of the top-portion 103 of the tower 102 in the wind turbine 100 referred to in FIG. 1 and FIG. 2. As previously noted with reference to FIG. 1, the tower-fore-aft velocity 402, for example, may be determined by the turbine controller 308 (referred to in FIG. 3). The tower-fore-aft velocity 402, is determined, received, and/or updated in real-time, for example.

At block 401, a check is carried out to determine whether a shutdown process is ordered for the wind turbine. When at block 401 it is determined that the shutdown has not been ordered, the control is looped back to 401 to recheck whether the shutdown has been ordered, or the control is transferred to stop the method 400. At block 401, when it is determined that the shutdown is ordered, the control is transferred to block 404.

At block 404, blades of the wind turbine 100 are non-linearly pitched out at a pitch rate determined based upon the tower-fore-aft velocity 402, towards a feather position. The blades, for example, may be the blades 106 of the wind turbine 100 referred to in FIG. 1. As previously noted with reference to FIG. 3, the pitch rate, for example, may be a first pitch rate or a second pitch rate where the first pitch rate is faster than the second pitch rate. In one embodiment, the first pitch rate is a rated pitch rate of the wind turbine. In one embodiment, the blades may be pitched out at the first pitch towards the feather position when the tower-fore-aft velocity 402 is greater than or equal to a determined value. In one embodiment, the determined value is substantially zero meter/second. In another embodiment, the blades may be pitched out at the second pitch rate towards the feather position when the tower-fore-aft velocity 402 is less than the determined value. In one embodiment, the second pitch rate may include multiple pitch rates. Accordingly, in one embodiment, the turbine controller 406 may shutdown the wind turbine 100 at the second pitch rate when the tower-fore-aft velocity 402 is less than the determined value. Pitching out of the blades at the first pitch rate or the second pitch rate based upon tower-fore-aft velocity will be explained in greater detail with reference to FIG. 5.

Figure 5:
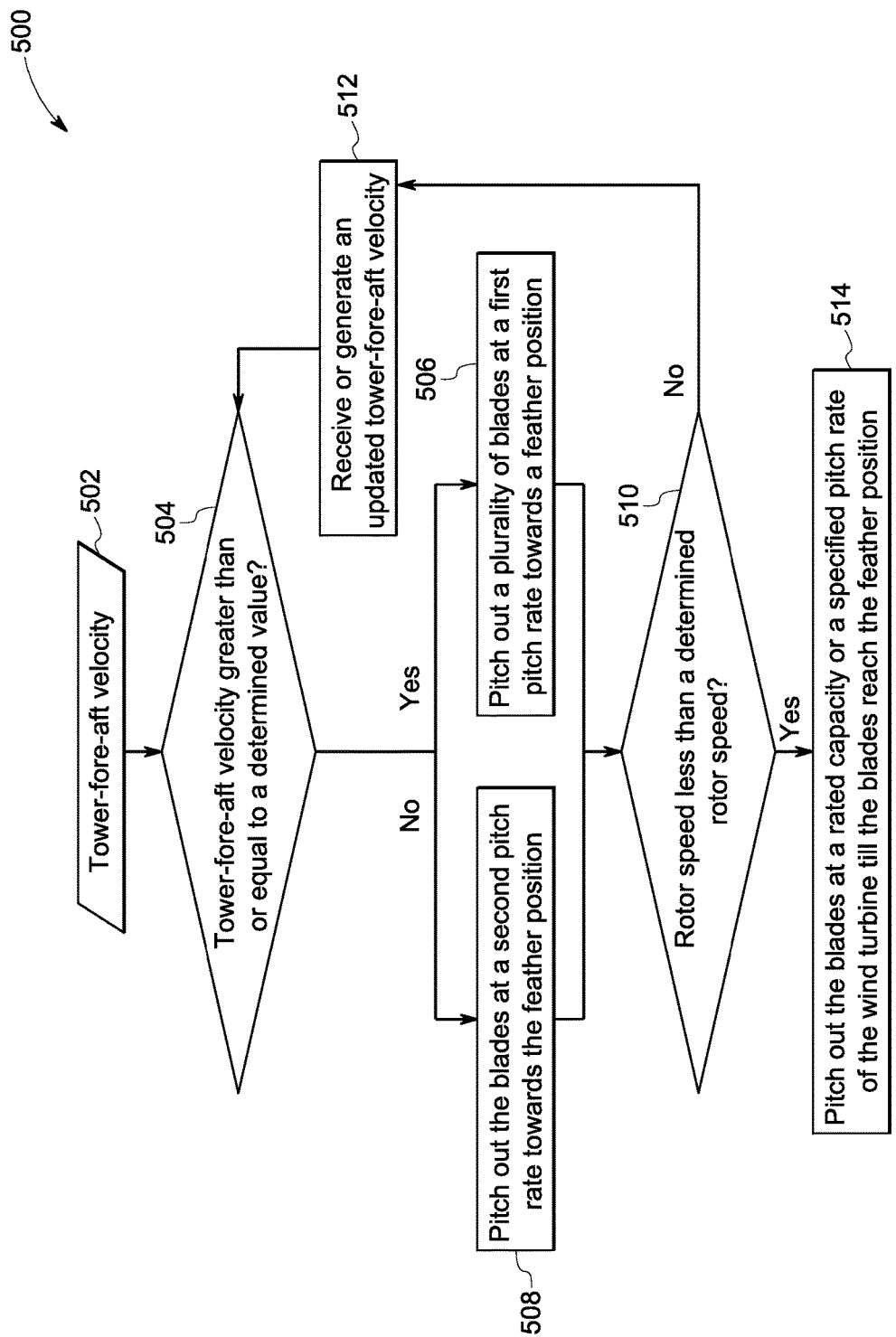
FIG. 5 is a flow chart illustrating an exemplary method to shut down a wind turbine, in accordance with another embodiment of the present techniques.

FIG. 5 is a flow chart illustrating an exemplary method 500 to control a wind turbine, in accordance with one embodiment of the present techniques. In one embodiment, FIG. 5 explains block 404 of FIG. 4 in greater detail. The wind turbine, for example, may be the wind turbine 100 referred to in FIG. 1. Reference numeral 502 is representative of a tower-fore-aft velocity of a top-portion of a tower in the wind turbine. It is noted that in the presently described method when the tower-fore aft velocity 502 is positive, the tower-fore-aft velocity 502 indicates downwind movement of the top-portion of the tower, and when the tower-fore-aft velocity 502 is negative, the tower-fore-aft velocity 502 indicates upwind movement of the top-portion of the tower. The tower-fore-aft velocity 502, for example, may be the tower-fore-aft velocity 402 referred to in FIG. 4. In one embodiment, the tower-fore-aft velocity 502 may be determined by the turbine controller 308 referred to in FIG. 3. In the presently shown configuration, at block 504, a check is carried out to determine whether the tower-fore-aft velocity 502 is greater than or equal to a determined value. The determined value, for example may be substantially about zero or −0.1 meter/second when the downwind movement of the top portion of the tower of the wind turbine is indicated by a positive tower-fore-aft velocity and an upwind movement of the top portion of the tower is indicated by a negative tower-fore-aft velocity. Alternatively, the determined value, for example may be substantially about zero or +0.1 meter/second when the downwind movement of the top portion of the tower of the wind turbine is indicated by a negative tower-fore-aft velocity and an upwind movement of the top portion of the tower is indicated by a positive tower-fore-aft velocity. At the block 504, when it is determined that the tower-fore-aft velocity 502 is greater than or equal to the determined value, the control is transferred to block 506. It is noted that in the presently described configuration, when a tower-fore-aft velocity is greater than or equal to the determined value, the tower-fore-aft velocity is indicative of downwind movement of the top-portion of the tower.

At block 506, a plurality of blades in the wind turbine are pitched out at a first pitch rate towards a feather position. As previously noted, the first pitch rate, for example, may be a rated pitch rate of the wind turbine. In one embodiment, the first pitch rate is a fixed pitch rate.

Referring back to block 504, when it is determined that the tower-fore-aft velocity is less than the determined value, the control is transferred to block 508. It is noted that in the presently shown configuration, when the tower-fore-aft velocity 502 is less than the determined value, the tower-fore-aft velocity 502 is indicative of upwind movement of the top-portion of the tower. At the block 508, the blades are pitched out at a second pitch rate towards the feather position. The second pitch rate, for example is slower than the first pitch rate. In one embodiment, the second pitch rate is determined by application of linear control law. In still another embodiment, the second pitch rate is determined based upon multiple factors, such as, wind speed, rotor velocity set point, maximum rotor speed, optimal tip speed ratio operating point, measured generator speed, linear control gains, state of mechanical brake and other functional control loops contributing to pitch command.

In the presently shown configuration, subsequent to the blocks 506 and 508, the control is transferred to a block 510. At block 510, a check is carried out to determine whether speed of a rotor in the wind turbine is less than a determined rotor speed. The determined rotor speed, for example, depends upon configuration of a wind turbine or as selected by a user who directly or indirectly controls the wind turbine. At block 510 when it is determined that the speed of the rotor is not less than the determined rotor speed, the control is transferred to block 512. At block 512, an updated tower-fore-aft velocity is received. Subsequent to the receipt of the updated tower-fore-aft velocity, steps 504 to 510 are executed using the updated tower-fore-aft velocity. The tower-fore-aft velocity 502, for example, may be generated or received at a time stamp T, and the updated tower-fore-aft velocity may be generated at a time stamp T+n.

With returning reference to block 510, when it is determined that the speed of the rotor in the wind turbine is less than the determined rotor speed, the control is transferred to block 514. At block 514, the blades are pitched out towards the feather position at the rated capacity of the wind turbine or a specified pitch rate till the wind turbine stops. In one embodiment, at block 514, the blades may be pitched out towards the feather position at the first pitch rate. Therefore, pitching out the blades at the rated capacity of the wind turbine or at specified pitch rate results in the shutdown of the wind turbine.

Figure 6A:
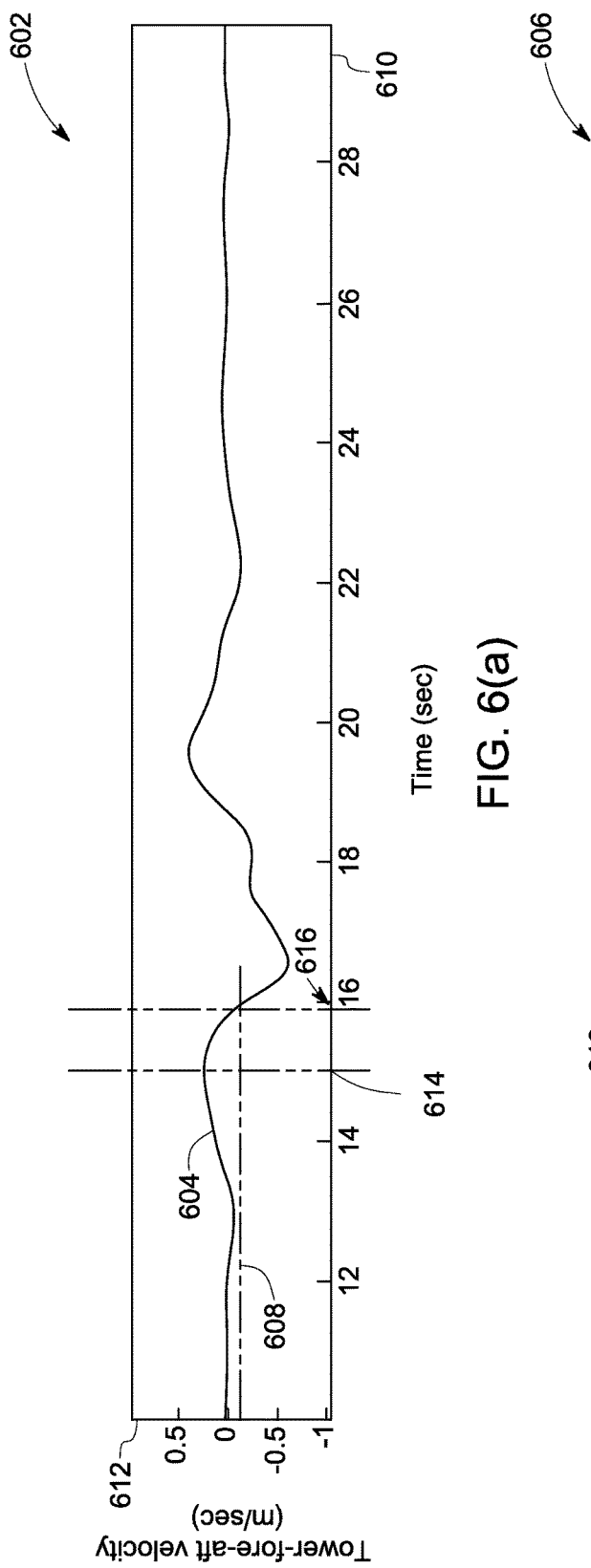
FIG. 6(a) is a plot of a simulated tower-fore-aft velocity signal of a tower of a wind turbine that is shut down at simulated pitch rates determined based upon the tower-fore-aft velocity signal.
Figure 6B:
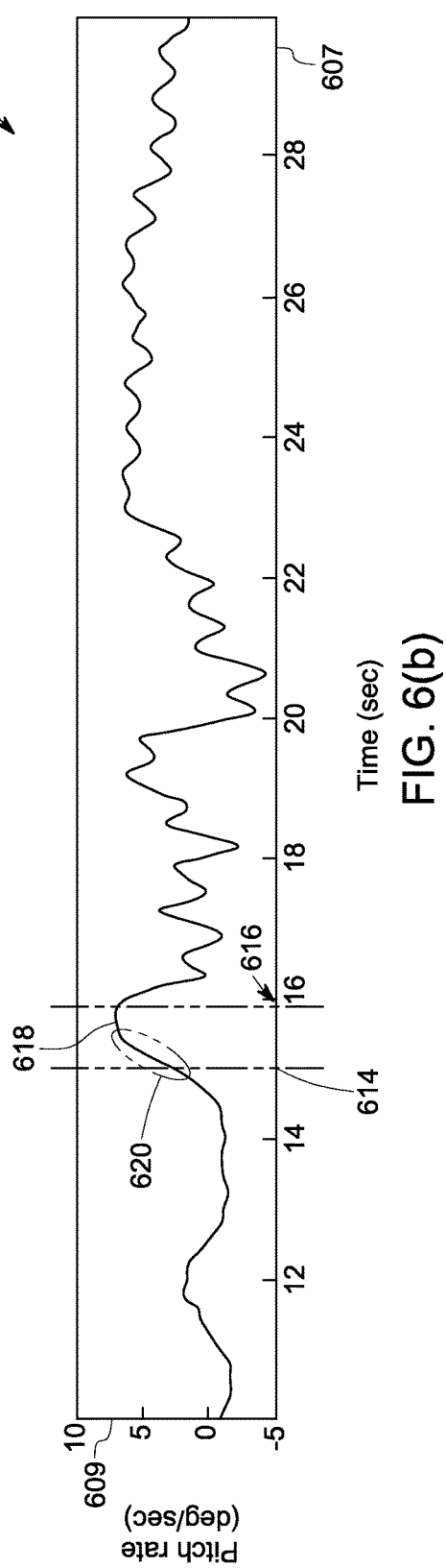
FIG. 6(b) is a plot of simulated pitch rates determined based upon tower-fore-aft velocity signal of a tower of the wind turbine.

FIG. 6(*a*) is a plot 602 of a simulated tower-fore-aft velocity signal 604 of a tower of a wind turbine that is shut down at simulated pitch rates determined based upon the tower-fore-aft velocity signal 604. In FIG. 6(*a*), X-axis 610 of the plot 602 is representative of time, and Y-axis 612 of the plot 602 is representative of tower-fore-aft velocity. FIG. 6(*b*) is a plot 606 of the simulated pitch rates determined based upon the tower-fore-aft velocity signal 604 of the tower of the wind turbine. In FIG. 6(*b*), X-axis 607 of the plot 606 is representative of time, and Y-axis 609 of the plot 608 is representative of the simulated pitch rates. In FIG. 6(*a*), reference numeral 604 is the tower-fore-aft velocity signal generated based upon tower-fore-aft velocities of the tower at multiple time stamps. Reference numeral 608 is representative of a determined value that is compared to the tower-fore-aft velocity signal 604. In FIG. 6(*a*), the determined value 608 is −0.1 meter per second. In the embodiment of FIG. 6(*a*) and FIG. 6(*b*), the onset of the shutdown of the wind turbine occurs at a time stamp 614.

As shown in FIG. 6(*a*), tower-fore-aft velocity of the tower at the time stamp 614 is greater than the determined value 608, and the tower-fore-aft velocity of the tower continues to be greater than the determined value 608 till a time stamp 616. In the embodiment, of FIG. 6(*a*) when the tower-fore-aft velocity of the tower is greater than the determined value 608, the tower-fore-aft velocity is indicative of downwind movement of a top-portion of the tower. Therefore, as shown in FIG. 6(*b*), blades of the wind turbine are pitched out towards a feather position at a simulated first pitch rate 618, from the onset of the shutdown at the time stamp 614 till the time stamp 616. It is noted that the wind turbine takes some time to reach the first pitch rate 618, and therefore the plot 606 shows an increasing pitch rate in a region 620. In the embodiment of FIG. 6(*b*), the first pitch rate 618 is the rated pitch rate of the wind turbine.

As shown in FIG. 6(*a*), the tower-fore-aft velocity of the tower becomes less than the determined value 608 at the time stamp 616. In the embodiment, of FIG. 6(*a*) when the tower-fore-aft velocity of the tower is less than the determined value 608, the tower-fore-aft velocity is indicative of an upwind movement of a top-portion of the tower. Therefore, as shown in FIG. 6(*b*), at the time stamp 616, the blades of the wind turbine are pitched out towards the feather position at a plurality of second pitch rates determined based upon linear control law or other factors. The pitching out of the blades towards the feather position at the first pitch rate from the time stamp 614 till the time stamp 616 reduces tower-fore-aft oscillations in the wind turbine.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method to shut down a wind turbine, comprising:
non-linearly pitching out a plurality of blades in the wind turbine towards a feather position by:
pitching out the plurality of blades at a first pitch rate towards the feather position when a tower-fore-aft velocity is greater than or equal to a value that is in a range from +0.1 to −0.1 meter/second and is indicative of a downwind movement of a top-portion of the tower; and
pitching out the plurality of blades at a second pitch rate different from the first pitch rate towards the feather position when the tower-fore-aft velocity is less than the value that is in the range from +0.1 to −0.1 meter/second and is indicative of an upwind movement of the top-portion of the tower.

2. The method of claim 1, wherein non-linearly pitching out the plurality of blades at the first pitch rate towards the feather position when the tower-fore-aft velocity is indicative of the downwind movement of the top-portion of the tower leads to nonlinear damping of the oscillations deflections of the tower.

3. The method of claim 1, wherein non-linearly pitching out the plurality of blades at the second pitch rate towards the feather position when the tower-fore-aft velocity is indicative of the upwind movement of the top-portion of the tower leads to nonlinear damping of the oscillations and deflections of the tower.

* * * * *